July 7, 1931.　　　A. W. REYNOLDS　　　1,813,511
ADJUSTING MEANS FOR AGRICULTURAL IMPLEMENTS
Filed April 23, 1929
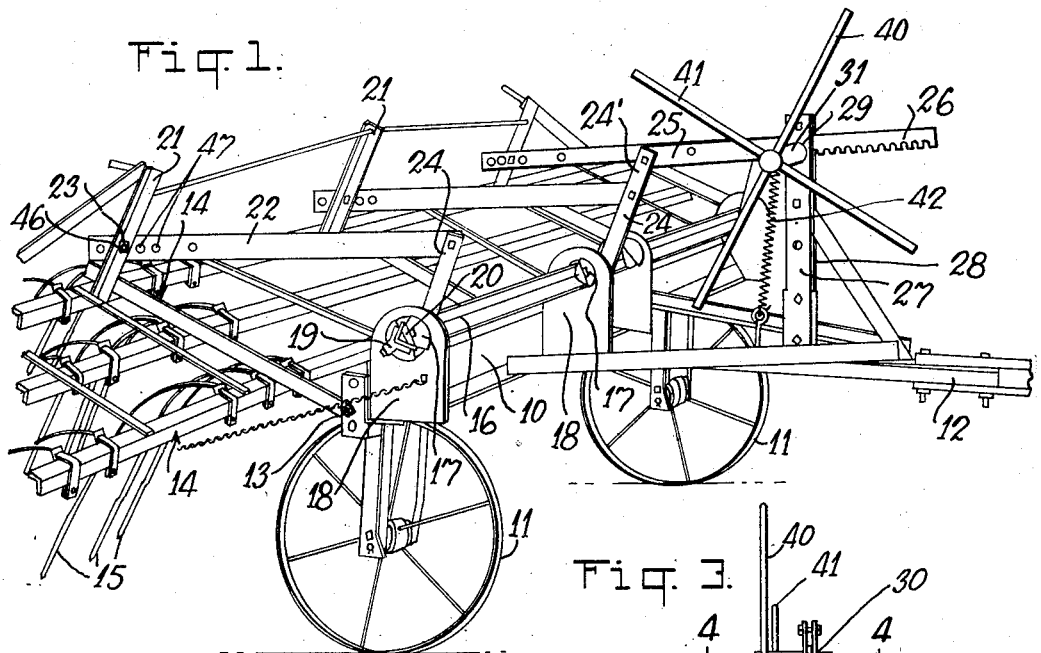
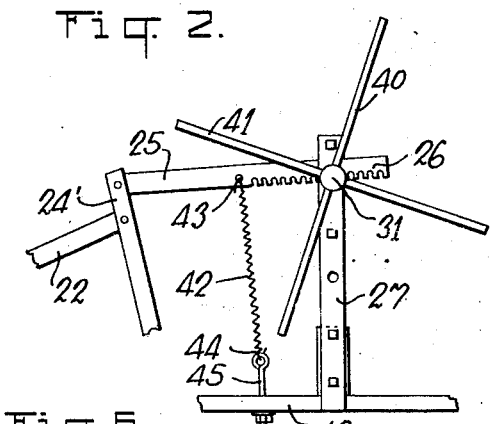
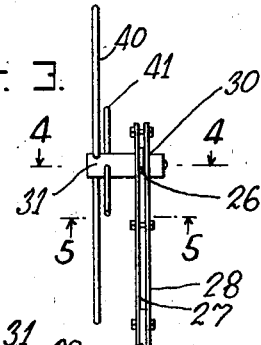
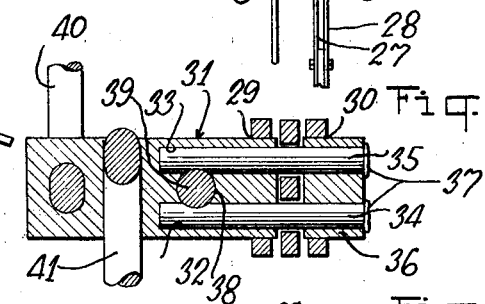
Inventor
Arthur W. Reynolds
By Attorney
Warfield & Watson Patented July 7, 1931

1,813,511

UNITED STATES PATENT OFFICE

ARTHUR W. REYNOLDS, OF LEONARDSVILLE, NEW YORK, ASSIGNOR TO THE BABCOCK MANUFACTURING COMPANY, OF LEONARDSVILLE, NEW YORK, A CORPORATION OF NEW YORK

ADJUSTING MEANS FOR AGRICULTURAL IMPLEMENTS

Application filed April 23, 1929. Serial No. 357,450.

This invention relates to adjusting devices and more particularly to adjusting devices for use in agricultural implements or the like.

An object of the invention is to provide an improved adjusting device equipped with self-locking and releasing means.

Another object is to provide an improved device for lifting or otherwise adjusting a portion of an agricultural implement of the like.

Another object is to provide in an agricultural implement or the like an easily operable adjusting device equipped with self-locking and releasing means.

A more specific object is to provide improved means for lifting the frame of a weeder, harrow, cultivator or similar agricultural implement and for adjusting the position of the same so as to control the position of ground-working elements carried by the frame with respect to the ground.

An additional object is to provide an adjusting device which is sturdy in construction, simple and economical of manufacture and assembly, easily operable and readily adapted for use in an agricultural implement or the like.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Figure 1 is a perspective view of the weeder embodying the invention;

Fig. 2 is a side view of the adjusting means shown in Fig. 1 illustrating the actuating bar in a rearward position;

Fig. 3 is a front view of the adjusting means;

Fig. 4 is a detail sectional view taken in the direction of the arrows along the line 4—4 in Fig. 3;

Fig. 5 is a partly sectional bottom view taken in the direction of the arrows along the line 5—5 in Fig. 3; and Fig. 6 is a front view illustrating a slightly modified construction.

The invention is exemplified as embodied in a weeder.

The particular weeder illustrated comprises a support 10 carried on a pair of wheels 11 and equipped with a forwardly extending arm 12 to which tractive means are adapted to be attached. Pivotally secured at 13 to the rear of the support is a frame 14 to which there are secured in any suitable manner a plurality of ground-working teeth 15. In order to permit the adjustment of the position of the frame and to brace the same, the frame is connected to a cross-bar 16 rotatably mounted on the support 10. The bar 16 extends through bearing eyes 17 in the brackets 18 on the support, and is held therein by flanged bearing elements 19 and 20. Uprights 21 are provided at the rear of the weeder frame, and an adjusting bar 22 is pivotally connected, by means of a bolt 23, with each of these uprights, these adjusting bars being rigidly secured to the rotatable bar 16 by means of arms 24.

To an upward extension 24' on one of these arms there is pivotally mounted an operating bar 25, the forward end of which comprises a rack 26 having downwardly extending teeth. The rack 26 extends, in the present instance, between a pair of uprights 27 and 28 which are secured to the bar 12 and are formed with registering bearing eyes 29 and 30 adapted to contain rotatable means comprising a pair of tooth-like elements adapted to mesh with the teeth of the rack 26. In the present instance, a shaft 31 extending into the bearing eye 29, is formed on opposite sides of its axis of rotation with a pair of longitudinal bores 32 and 33 in which there are disposed a pair of pins 34 and 35. These pins extend beyond the end of the shaft 31, the outer ends of the pins being contained within bores in a shaft segment 36 which is adapted to extend into the bearing eye 30, the pins being suitably secured to the shaft as by means of welds 37. In order to secure the pins in the bores 32 and 33 a transverse bore 38, which cuts one edge of each of the pins, is formed in the shaft 31 and a suitable transverse rod 39 is inserted therein. In order to permit the easy rotation of the shaft 31 there are mounted thereon a pair of handles 40 and 41, which, in the present instance, extend through transverse bores in the shaft. If desired, one of these handles, as the handle 41, may be utilized to retain the longitudinal pins in place as indicated in Fig. 6.

As will be seen, the rack 26 rests on one or more of the pins, with which it is adapted to mesh, so that as the pins are swung during the rotation of the shaft, they move the bar 25 forwardly or rearwardly, as desired. In the exemplified construction, a forward movement of the bar acts to swing the frame upwardly on its pivots 13 so that the teeth 15 will cut less deeply into the ground and, if continued, to raise the frame to a position where the teeth are entirely above the ground as in Fig. 1. A rearward movement of the bar 25 allows the frame to drop and pushes the teeth into the ground to a desired depth. When the shaft 31 is brought to rest with the pins each in the slots between the teeth of the rack so as to be centered with respect to the direction of movement of the rack, the frame is securely locked in its adjusted position, since any pull on the bar 25 cannot swing the pins and will not rotate the shaft 31. It is only when the shaft 31 is positively rotated so as to initiate a swinging movement of the pins that a pull on the arm 25 may impart rotation to the shaft 31. Thus, when the frame of a weeder, such as shown in Fig. 1, is lifted and the shaft 31 returned so that the pins 34 and 35 are substantially horizontal, each meshing with the rack, the frame is securely locked in its lifted position and remains in this position until the shaft 31 is rotated, whereupon, unless the rotation of the shaft is stopped with the pins in a horizontal position, the frame will drop to the ground. There is thus provided an adjusting means which is adapted to lock itself automatically after one or more half turns of a rotary element, and which is adapted to release itself automatically when a rotation of the rotary element is initiated.

It is to be observed in this connection that the term "pins" as used herein, when not applied specifically to the exemplified elements 34 and 35 is to be understood to designate any elements which are adapted to be swung into and out of the slots in a rack for the purposes set forth.

In order to provide for holding the rack firmly in place, and at the same time to permit the rack to be so formed that a particularly efficient lifting or adjusting action may be had, the invention contemplates the provision of a structure wherein the rack is held against the pins, but wherein the rack may be lifted slightly as a pin is carried upwardly in the rotation of the shaft. To this end, there is provided in the exemplified apparatus a spring 42 connected at 43 with the arm 25 and at 44 to an eyebolt 45 secured to the arm 12. Thus, the bar 25 is pulled downwardly so as to hold the rack 26 firmly in place, while permitting the rack to be constructed so that the pins will have a greater effective action thereon than would be the case if the rack were secured against movement in any but a longitudinal direction. If, for example, the rack were mounted so as to permit the movement thereof only in its operative direction, it would be necessary to form the rack with relatively long and narrow teeth and with relatively wide and deep slots so that the pins would not bind in swinging into and out of mesh. When, however, the rack is mounted so that it may be moved laterally (upwardly, in the present instance) each half turn of the shaft, the pins may be spaced to any desired extent to give the desired leverage and the desired speed of action, and the teeth and slotted portions of the rack may be correspondingly formed; it being unnecessary to allow for any extensive swinging movement of the pins. In certain instances the weight of the rack, or of an element attached to the rack, may be relied upon to hold the rack against the pins. The employment of resilient means, however, positively prevents the rack from slipping and makes for certainty of operation and permanence of construction.

In order to adapt the harrow for use in different types of soil, and to permit the same to be lifted to a greater or less extent as the length of the digging elements or the character of the ground may dictate, there are provided adjustable means for connecting the operating bar, such as 25, with the frame. To this end, there is provided in the exemplified apparatus a nut 46 on the bolt 23 and a plurality of holes 47 in each of the bars 22.

As will be apparent, the support on which the frame and the adjusting device are mounted may be of any desired type, consisting, for example, of a part of the frame of a tractor or similar element, and the arrangement of the frame, the type of movement which is transmitted thereto, and various other elements of the exemplified construction may be varied widely without departing from the invention. Moreover, adjusting means such as contemplated by the invention may be utilized for a variety of purposes and in a number of different constructions.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In an agricultural implement or the like, the combination of a support, a frame adjustably mounted on said support, ground-working implements carried by said frame, a rack connected to said frame, a member carried by said support and mounted for rotation on an axis transverse to said rack, a pair of pins carried by said rotatable element and adapted to extend between the teeth of said rack, and a spring secured to said support and tending to pull said rack against said pins.

2. In an agricultural implement or the like, the combination of a support, a frame adjustably mounted on said support, ground-working implements carried by said frame, an upright on said support, a shaft rotatably mounted in said upright, a rack connected to said frame and extending transversely of the upright and above said shaft, said shaft carrying a pair of pins adapted to mesh with the teeth of said rack to actuate the same and to lock the same in an adjusted position, means to hold said rack against said pin, and a pair of rods extending through said shaft at right angles to each other for rotating said shaft.

3. In an agricultural implement or the like, the combination of a support, a frame adjustably mounted on said support, ground-working implements carried by said frame, a variable length connection between said rack and said frame, a member carried by said support and mounted for rotation on an axis transverse to said rack, a pair of pins carried by said rotatable element and adapted to extend between the teeth of said rack, and a spring secured to said support and tending to pull said rack against said pins.

4. An adjusting device, comprising a support, a rotatable element mounted on said support, a pair of pins carried by said rotatable element, a rack adapted to rest on said pins and operatively connected to a member to be adjusted, said rack being mounted to permit the same to be lifted away from the axis of the rotatable member as each pin is raised during the rotation of said rotatable member and to move downwardly toward the axis of the rotatable member as the pins are moved into aligned relationship, and said pins being adapted to lock said rack against operative movement when the rack is in its lowermost position.

5. An adjusting device, comprising a support, a rotatable element mounted on said support, a pair of pins carried by said rotatable element, a horizontal rack, the teeth of which extend downwardly over said pins, and means for pivotally supporting said rack whereby, when said pins are in horizontal relationship, said rack will settle over the pins to receive the pins in the base of the notches between the teeth of the rack and to lock the rack in adjusted position until said rotatable element is positively actuated to swing the pins from horizontal position.

6. An adjusting device, comprising a support, a member rotatably mounted on said support, a rack, a pair of pins carried by said rotatable member and adapted to actuate said rack and to lock the same in an adjusted position, and means for resiliently holding said rack against said pins.

7. An adjusting device, comprising a rotatable member, a rack mounted for longitudinal movement in a direction transverse to the axis of the rotatable member and for lateral movement in a direction also transverse to said axis, a pair of elements carried by said rotatable member and adapted to mesh with said rack, and resilient means acting in said lateral direction and tending to hold said rack against said meshing elements.

8. An adjusting device, comprising a support, an upright on said support, a shaft rotatably mounted in said upright, a rack extending transversely of the upright and above the shaft, said shaft carrying a pair of pins adapted to mesh with the teeth of said rack, and a spring tending to hold said rack against said pins.

9. An adjusting device, comprising a shaft, a pair of pins mounted in longitudinal bores of said shaft, an element mounted in a transverse bore in said shaft and extending into recesses in the sides of said pins to hold the same in the shaft, and a rack adapted to mesh with said pins.

10. An adjusting device, comprising a shaft, a pair of pins mounted in longitudinal bores of said shaft, a handle member mounted in a transverse bore in said shaft and adapted for use in the rotation of the shaft, said handle member being arranged to hold said pins in said shaft, and a rack adapted to mesh with said pins.

11. In an agricultural implement or the like, the combination of a support, a frame adjustably mounted on said support, ground-working implements carried by said frame, a rotatable element carried by said support, a pair of pins carried by said rotatable element, and a rack connected with said frame for the adjustment thereof in response to the longitudinal movement of the rack, said rack being formed with a series of relatively shallow notches for the reception of said pins and being arranged to be lifted by said pins twice in each rotation of said rotatable element and to settle against said pins intermediate said lifting operations.

12. In a harrow or the like, the combination of a support, a tooth-carrying frame pivotally connected at its forward side to said support, a pair of braces extending upwardly from said support, an element rotatably supported by said braces and comprising a pair of pins in the space between said braces, a rack extending between said braces and adapted to rest on said pins, and means for connecting said rack to the rear side of said frame.

13. In a harrow or the like, the combination of a support, a tooth-carrying frame pivotally connected at its forward side to said support, a pair of braces extending upwardly from said support, an element rotatably supported by said braces and comprising a pair of pins in the space between said braces, a rack extending between said braces and adapted to rest on said pins, a spring extending between said support and said rack for holding said rack against said pins, and means for connecting said rack to the rear side of said frame.

14. An adjusting device, comprising a support, a member rotatably mounted on said support, a rack, a pair of pins carried by said rotatable member and adapted to actuate said rack and to lock the same in an adjusted position, and means for holding said rack against said pins.

In testimony whereof I affix my signature.

ARTHUR W. REYNOLDS.